United States Patent
Laursen et al.

(10) Patent No.: US 9,311,027 B2
(45) Date of Patent: Apr. 12, 2016

(54) DOCUMENT GENERATION BASED ON TARGET DEVICE AVAILABILITY

(71) Applicant: Hewlett-Packard Development Company, L.P., Houston, TX (US)

(72) Inventors: Dana E. Laursen, Corvallis, OR (US); Glade William Diviney, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/852,479

(22) Filed: Mar. 28, 2013

(65) Prior Publication Data

US 2014/0293321 A1  Oct. 2, 2014

(51) Int. Cl.
*G06F 3/12* (2006.01)
*G06F 15/00* (2006.01)

(52) U.S. Cl.
CPC .............. *G06F 3/1218* (2013.01); *G06F 3/126* (2013.01); *G06F 3/1229* (2013.01); *G06F 3/1285* (2013.01)

(58) Field of Classification Search
CPC ... G06F 3/1203; G06F 3/1288; G06F 3/1273; G06F 3/1239
USPC .......... 358/1.1, 1.4, 1.5, 1.9, 1.11, 1.12, 1.13, 358/1.14, 1.15, 1.16, 1.17, 1.18
See application file for complete search history.

(56) References Cited

U.S. PATENT DOCUMENTS

| | | | |
|---|---|---|---|
| 5,583,621 A | 12/1996 | Narukawa | |
| 5,663,750 A | 9/1997 | Sakuma | |
| 6,335,795 B1 * | 1/2002 | Neuhard et al. | 358/1.15 |
| 6,671,066 B1 | 12/2003 | Aikawa et al. | |
| 6,894,804 B2 | 5/2005 | Nguyen et al. | |
| 6,924,903 B2 | 8/2005 | Brooks et al. | |
| 7,375,842 B2 | 5/2008 | Kloosterman et al. | |
| 7,679,770 B2 | 3/2010 | Fertlitsch et al. | |
| 8,194,272 B2 | 6/2012 | Yoshizumi et al. | |
| 8,363,255 B2 | 1/2013 | Liu et al. | |
| 8,514,422 B2 | 8/2013 | Kimura | |
| 8,593,653 B2 | 11/2013 | Fujimori et al. | |
| 2002/0034392 A1 | 3/2002 | Baum et al. | |
| 2002/0042884 A1 | 4/2002 | Wu et al. | |
| 2004/0015687 A1 | 1/2004 | Chiarabini et al. | |
| 2004/0179230 A1 | 9/2004 | Kitada et al. | |
| 2004/0197124 A1 | 10/2004 | Klassen | |
| 2005/0073705 A1 | 4/2005 | Hall et al. | |

(Continued)

FOREIGN PATENT DOCUMENTS

EP  1259887 A1  11/2002
EP  2641746 A1  9/2013

(Continued)

OTHER PUBLICATIONS

Grundy, J., How to Check Printer Status Using Java, Apr. 16, 2012, 4 pps., http://www.ehow.com/how_7807221_check-printer-status-using-java.html.

(Continued)

*Primary Examiner* — Thierry L Pham

(74) *Attorney, Agent, or Firm* — HP Inc. Patent Department

(57) ABSTRACT

Examples disclose a method to query an availability of a target device. Additionally, the method generates a document for transmission to the target device based on the availability of the target device.

17 Claims, 6 Drawing Sheets

(56) References Cited

U.S. PATENT DOCUMENTS

| | | | |
|---|---|---|---|
| 2006/0087676 A1* | 4/2006 | Hotokeishi | 358/1.15 |
| 2006/0227363 A1 | 10/2006 | Ogura | |
| 2007/0121144 A1* | 5/2007 | Kato | 358/1.14 |
| 2007/0247654 A1* | 10/2007 | Tian | 358/1.14 |
| 2008/0204793 A1* | 8/2008 | Shaw | 358/1.15 |
| 2009/0179991 A1* | 7/2009 | Mohammad | 348/207.2 |
| 2009/0251718 A1 | 10/2009 | Khain | |
| 2010/0030707 A1 | 2/2010 | Jingu | |
| 2010/0053657 A1 | 3/2010 | Weber | |
| 2010/0053664 A1 | 3/2010 | Mandel et al. | |
| 2010/0128297 A1 | 5/2010 | Redd et al. | |
| 2010/0188688 A1* | 7/2010 | Selvaraj et al. | 358/1.15 |
| 2010/0225957 A1* | 9/2010 | Liu | 358/1.15 |
| 2010/0328703 A1 | 12/2010 | Cain | |
| 2011/0019222 A1* | 1/2011 | Tang et al. | 358/1.14 |
| 2011/0102826 A1* | 5/2011 | Fujiwara et al. | 358/1.13 |
| 2011/0194140 A1 | 8/2011 | Sweet et al. | |
| 2011/0317209 A1* | 12/2011 | Uchida | 358/1.15 |
| 2012/0026548 A1* | 2/2012 | Nakagawa | 358/1.15 |
| 2012/0062935 A1 | 3/2012 | Kamath et al. | |
| 2012/0194850 A1* | 8/2012 | K. et al. | 358/1.15 |
| 2012/0218576 A1* | 8/2012 | Sekine et al. | 358/1.13 |
| 2012/0314240 A1 | 12/2012 | Randell et al. | |
| 2013/0229679 A1 | 9/2013 | Kamath et al. | |

FOREIGN PATENT DOCUMENTS

| | | |
|---|---|---|
| FR | 2811458 A1 | 1/2002 |
| JP | 2003260853 A | 9/2003 |
| JP | 2006007487 A | 1/2006 |
| JP | 2006252119 A | 9/2006 |

OTHER PUBLICATIONS

Konica Minolta Business Solutions, "Print Pool Manager," (Web Page), retrieved on Mar. 28, 2014 at <http://develop.ov4.de/en/products/0/115_produkte-detail.htm?ovs_pm=1>.

Crawford, L.S. et al., "Synchronized Control in a Large-Scale Networked Distributed Printing System," (Research Paper), 2009 IEEE International Conference on Robotics and Automation, Kobe, Japan, May 12-17, 2009, pp. 158-163.

Obviousidea.com, "GreenCloud is the green pdf creator—ink saver driver and word to PDF converter to boost your existing printer !," Aug. 19, 2013, <http://www.obviousidea.com/windows-software/greencloud-printer/>.

Coupons, "The Best Way to Save Money Using Coupons," Sep. 4, 2012, <http://www.coupons.com/thegoodstuff/guide-to-coupons-com/>.

Coupons.com, "Free Printable Coupons, Online Coupons & Coupon Codes," Feb. 4, 2012, <http://web.archive.org/web/20120204014348/http://www.coupons.com/>.

Wikipedia, "Coupons.com," Feb. 19, 2012, <https://en.wikipedia.org/w/index.php?title=Coupons.com&oldid=477766936>.

Hewlett-Packard Development Company, L.P., "Browse Print Apps," Oct. 25, 2011, ePrintCenter, Coupons.com, <http://web.archive.org/web/20111025075527/http://h30495.www3.hp.com/apps?tag=coupons>.

Hewlett-Packard Development Company, L.P., "Coupons.com," Oct. 19, 2011, ePrintCenter, Print App, <http://web.archive.org/web/20111019003850/http://h30495.www3.hp.com/detail/2>.

* cited by examiner

DOCUMENT GENERATION BASED ON TARGET DEVICE AVAILABILITY

BACKGROUND

Services for document generation and delivery may include printers and other target devices connected in networks to receive documents. The documents transmitted within the networks may have limited distribution, to particular devices and/or to the number of times the document is transmitted. Such documents may include coupons and/or personal content that may have limited distribution.

BRIEF DESCRIPTION OF THE DRAWINGS

In the accompanying drawings, like numerals refer to like components or blocks. The following detailed description references the drawings, wherein.

DETAILED DESCRIPTION

A document with limited distribution may be tracked through document generation and delivery systems, such as a printing system; however, it may be difficult to track the document once it has reached the printer or other target device. For example, the document may be submitted to the printer regardless of the printer availability. Such a printing job would fail as the printers may be unavailable, reducing the printer yield and wasting system resources. In another example, the document may be submitted to the printer once the printer became available; however, the content within the document may be stale (i.e., out of date) since the document may be generated in advance of the printer availability.

To address these issues, examples disclosed herein provide a method to effectively utilize resources by querying for target device availability prior to generating a document. The examples disclosed herein provide the method, executed by a computing device, to query the availability of the target device and depending on whether the target device is available, the method generates the document for transmission to the target device. The method may increase the delivery of successful documents to the target device by checking the availability, which reduces the system load as fewer failed documents are processed. Additionally, querying the availability of the target device prior to document generation provides up to date content within the document once the target device becomes available.

In another example, the method disclosed herein further includes wherein querying the availability of the target device includes obtaining an assurance value of the target device. The assurance value indicates a likelihood of success of a printing job completion and may be based on a prior printing job by the printer. Obtaining the assurance value of the target device enables the computing device to track the predictability of the target device over a period of time further increasing the successful delivery of documents.

Additionally, the examples provide the target device may include a printer, including the target device as the printer enables the method to go through printer readiness to increase printing jobs successfully delivered and/or printed at the printer. This improves the yield of print jobs as more print jobs are successfully delivered and printed.

In summary, examples disclosed herein provide an effective utilization of system resources by querying an availability of a target device prior to document generation. Additionally, the examples as disclosed herein reduce the system load as fewer failed documents are processed.

Figure 1:
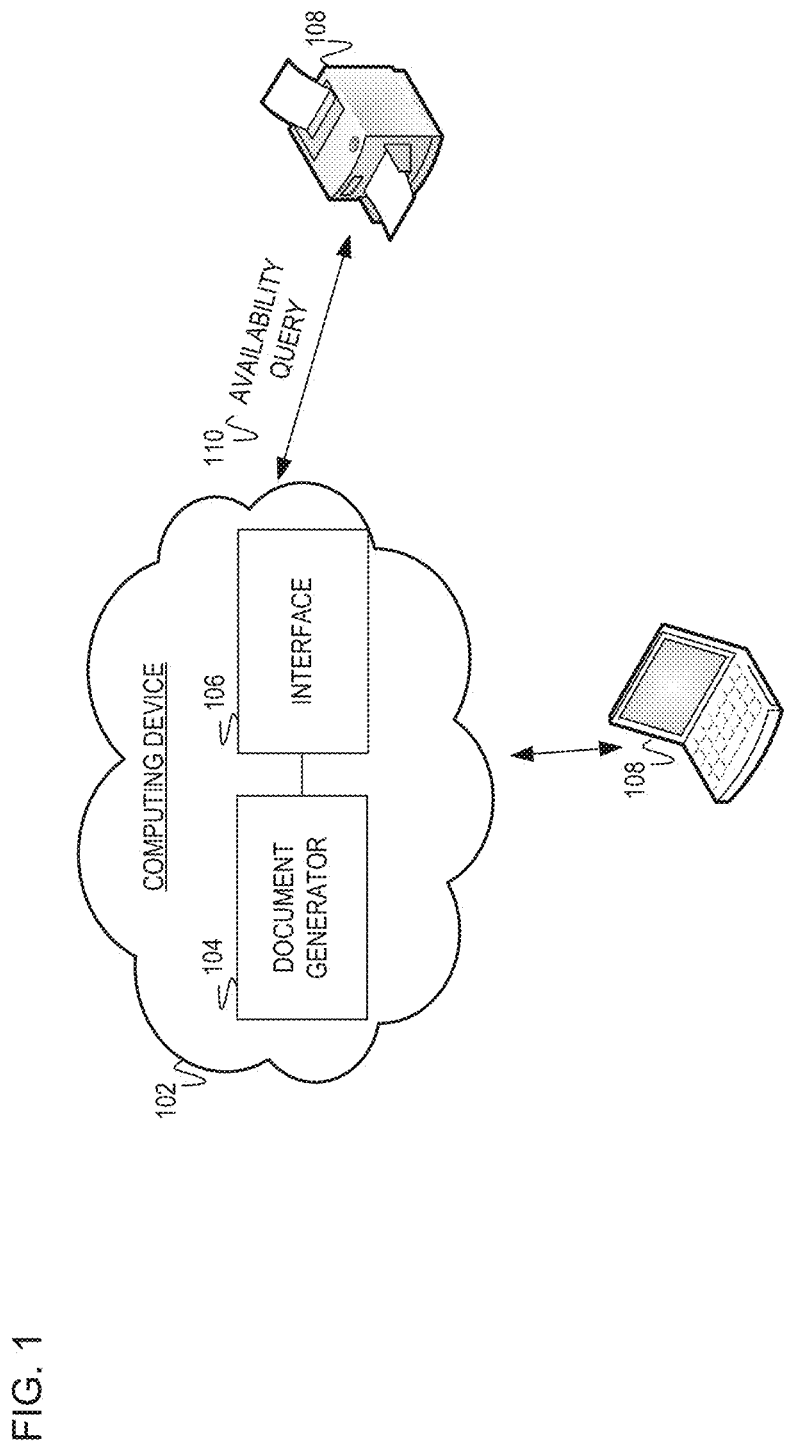
FIG. 1 is a block diagram of an example system including a computing device with an interface to query an availability of a target device and a content generator to generate a document based on the availability.

Referring now to the figures, FIG. 1 is a block diagram of an example networking system including a computing device 102 with an interface 106 to query an availability 110 of a target device 108. Based on the availability of the target device 108, the computing device 102 includes a document generator 104 to generate a document for transmission to the target device 108. The networking system represents a type of printing system with a network connection. The network may include a local area network (LAN) and/or wide area network (WAN). The computing device 102 is a host device that represents services that may be provided on a server within the network. Examples of the computing device 102 include a server, personal computer, mobile device, desktop computer, or other type of electronic device capable of interfacing with the target device 108 and generating a document.

The interface 106 queries the availability of the target device 108 to receive the generated document. The interface 106 refers to a point of interaction between the computing device 102 and the target device 108. In one example, the interface 106 includes an application programming interface (API) to query the availability of the target device 108. Examples of the interface 106 include a computing interface, hardware interface, programming interface, and/or application interface.

The document generator 104 generates content and/or document upon determining the target device 108 is available. The document is an electronic file that contains content and as such may include a word document, media document, text file, portable document format, or other type of electronic file for transmission to the target device 108 upon the determination the target device 108 is available. In one example, the document generator 104 is a service application located within the networking system. In this example, the computing device 102 communicates with this service on another computing device, such as a server, to obtain the document.

The availability query 110 is a communication from the computing device 102 to the target device 108. Upon receiving the availability query 110 from the target device 108, the computing device 102 may instruct the document generator 104 to proceed with generating the document for transmission to the target device 108. Querying for the availability by communication 110 prior to generating the document at generator 110, ensures the target device 108 is available fur the document that may include limited distribution that may otherwise waste resources. In one example, the availability of the target device 108 is based on previous documents transmitted to the target device 102. For example, the computing device 102 may receive a communication from the target device 108 once the previous document was successfully received by the target device 108. In another example, the interface 106 may receive a status code of the target device 108 that represents a current condition of the target device 108. For example, the current condition may include a potential hardware failure or whether the target device 108 has access to the networking system. These examples are explained in detail a later figure.

The target device 108 is a client device capable of communicating over a networking system. Examples of the target device 108 include a client device, personal computer, mobile device, desktop computer, or other type of electronic device capable of communication over the networking system.

Figure 2:
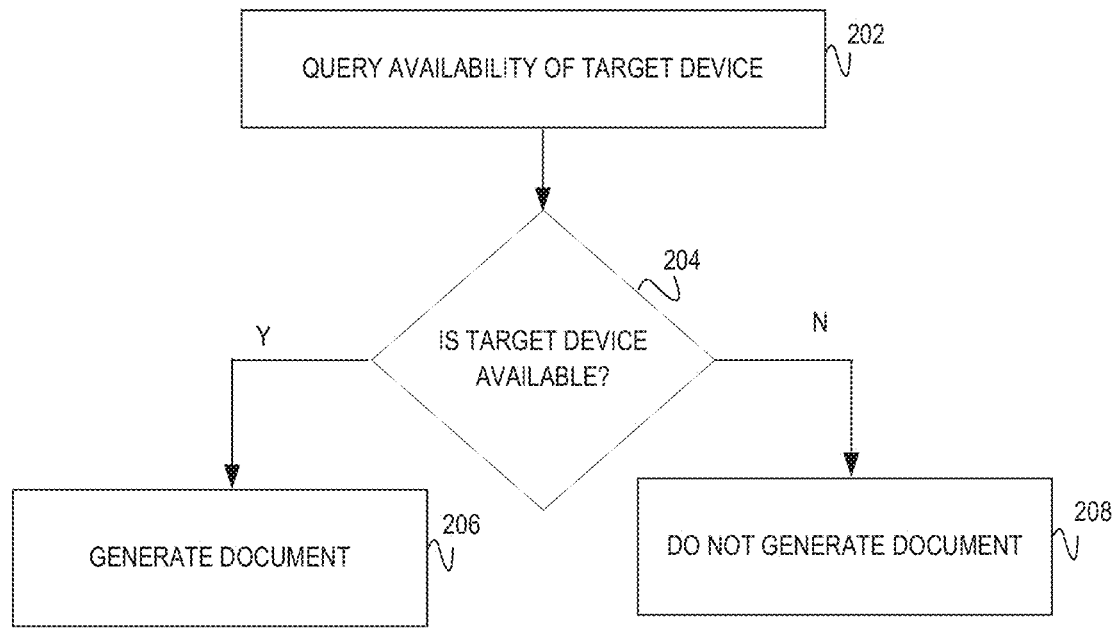
FIG. 2 is a flowchart of an example method to query an availability of a target device and depending the availability, either generating or not generating a document.

FIG. 2 is a flowchart of an example method to query an availability of a target device and depending on whether the target device is available, generating a document. In discussing FIG. 2, references may be made to the components in FIG. 1 to provide contextual examples. Further, although FIG. 2 is described as implemented by a computing device 102 as in FIG. 1, it may be implemented in the form of executable instructions on a machine-readable storage medium, such as machine-readable storage medium 604 as in FIG. 6.

At operation 202, the computing device queries the availability of the target device. The computing device confirms the target device availability prior to generating a document as at operation 206. An interface associated with the computing device may query the availability of the target device. The interface refers to a point of interaction between the computing device and the target device and as such may include an application programming interface (APT), computing interface, hardware interface, programming interface, and/or application interface. The availability of the target device may be based on previous documents transmitted to the target device. For example, the interface system between the computing device and the target device may receive a communication from the target device once the previous document was successfully received by the target device. In one example, the document may be requested by the target device or by a service delivering the document. In this example, the request may initiate querying the availability of the target device. In another example, the target device may include a printer, thus querying the availability of the printer ensures the printer is ready to receive a document to increase the success of the generated documents. Querying the availability, the computing device may then determine whether the target device is available at operation 204 for a transmission of the document to the target device.

At operation 204, the computing device determines whether the target device is available. If the target device is available, the computing device may generate the document as at operation 206. If the target device is unavailable, the computing device may not generate the document as at operation 208. The computing device may include instructions obtained from a storage area corresponding to the computing device to determine which operations to execute. Ensuring the target device is available prior to generating the document as at operation 206, ensures resources are used upon determination the target device is available and prevents using resources when the target device is unavailable. The computing device checks the target device's status, such as if the target device is available to receive a document and print the document. The availability of the target device is based on a previous document transmitted to the target device. The availability of the previous document may include a communication from the target device to the computing device, the communication may include a status code that represents a state of the target device. For example, the status code may include whether the target device is available on a networking system, whether the target device is low on ink, etc.

At operation 206, if the target device is available, the computing device may generate the document for transmission to the target device. The document generated at operation 206 may be with limited distribution. For example, the document may be generated a limited number of times and/or limited to a number of particular target devices indicating the generated document may be limited in allocation. In these examples, the generated document may include an identifier corresponding to the limited distribution and/or allocation to ensure the generated document is within its limits. In another example, the computing device may transmit a signal to a document generating service to obtain the document. In a further example, the generated document may include a coupon, so the computing device may transmit a signal to the coupon service requesting the coupon. The service may then generate the coupon for the computing device to transmit to the target device. In a further example, the computing device may generate the document from a storage component associated with the computing device.

At operation 208, if the target device is unavailable, the computing device may not generate the document. In one example, if the target device is unavailable, the computing device may determine whether the maximum number of queries to check the availability of the target device has been reached. If the maximum number of queries has been reached, the computing device aborts the queries. If the maximum number of queries has not been reached, the computing device continues querying the availability of the target device until the target device is available or until the maximum number of queries has been reached. This example is explained in detail in the next figure.

Figure 3:
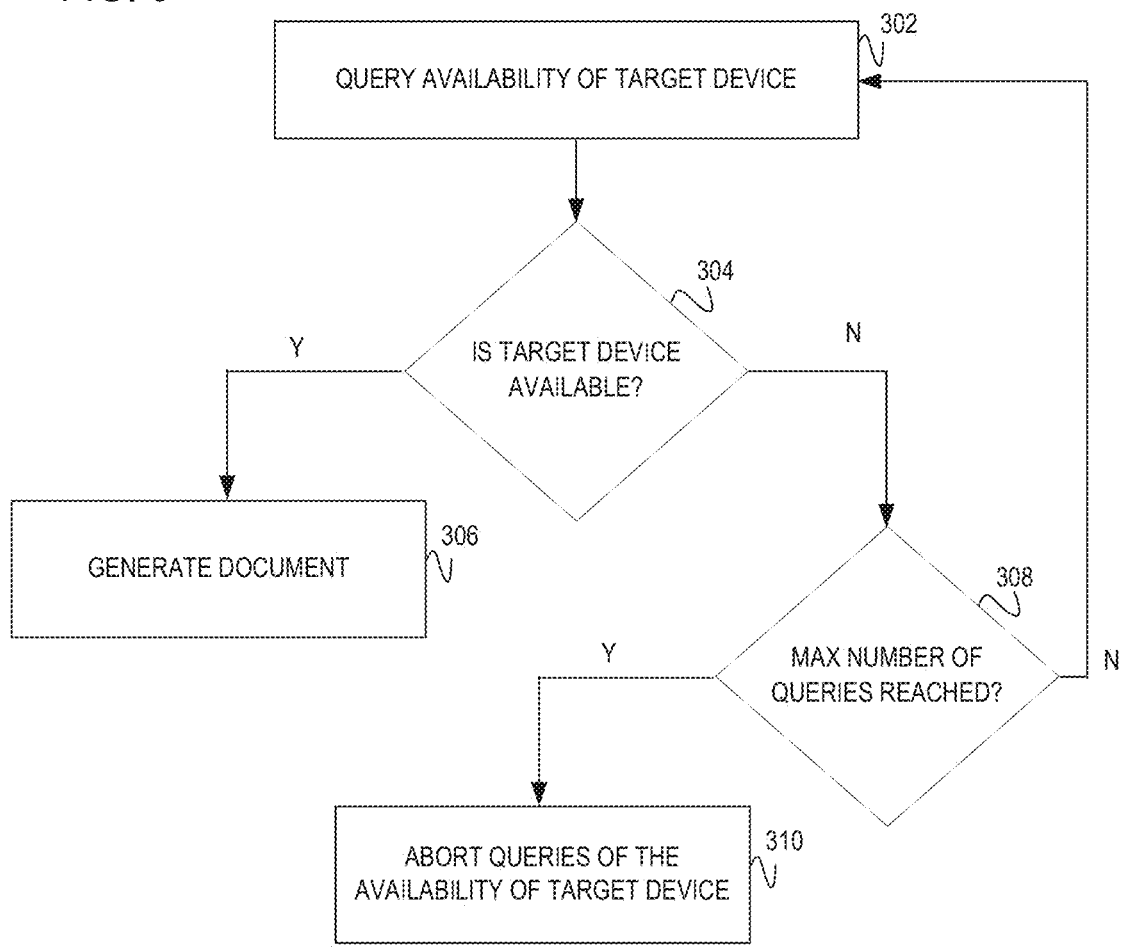
FIG. 3 is a flowchart of an example method to query an availability of a target device and determine whether a maximum number of queries has been reached.

FIG. 3 is a flowchart of an example method to query an availability of a target device and determine whether a maximum number of queries to the target device have been reached. In discussing FIG. 3, references may be made to the components in FIG. 1 to provide contextual examples. Further, although FIG. 3 is described as implemented by a computing device 102 as in FIG. 1, it may be implemented in the form of executable instructions on a machine-readable storage medium, such as machine-readable storage medium 604 as in FIG. 6.

At operations 302-306, the computing device queries the availability of the target device, determines whether the target device is available, and generates a document if the target device is available. Operations 302-306 may be similar in functionality to operations 202-206 as in FIG. 2.

At operation 308, if the target device is unavailable, the computing device will determine if the maximum number of queries have been reached. If the maximum number of queries has not been reached, the computing device may re-query the availability of the target device as at operation 302. In this example, the computing device may wait a period of time prior to re-querying the availability of the target device. This enables the computing device to query the target device periodically. If the maximum number of queries has been reached, the computing device aborts the queries of the availability of the target device. The maximum number of queries is a pre-defined. value as set by an administrator of the computing device.

At operation 310, the computing device aborts querying the target device for its availability. In operation 310, the document may include time-sensitive content, so by the time the target device is available after a period of multiple re-queries, the target device may receive out of date content. Setting the maximum number of queries ensures the content within the document is up to date for the target device. Additionally, tracking the maximum number of queries ensures the computing device does not waste resources on additional querying when the target device may be in a state of failure, etc.

Figure 4:
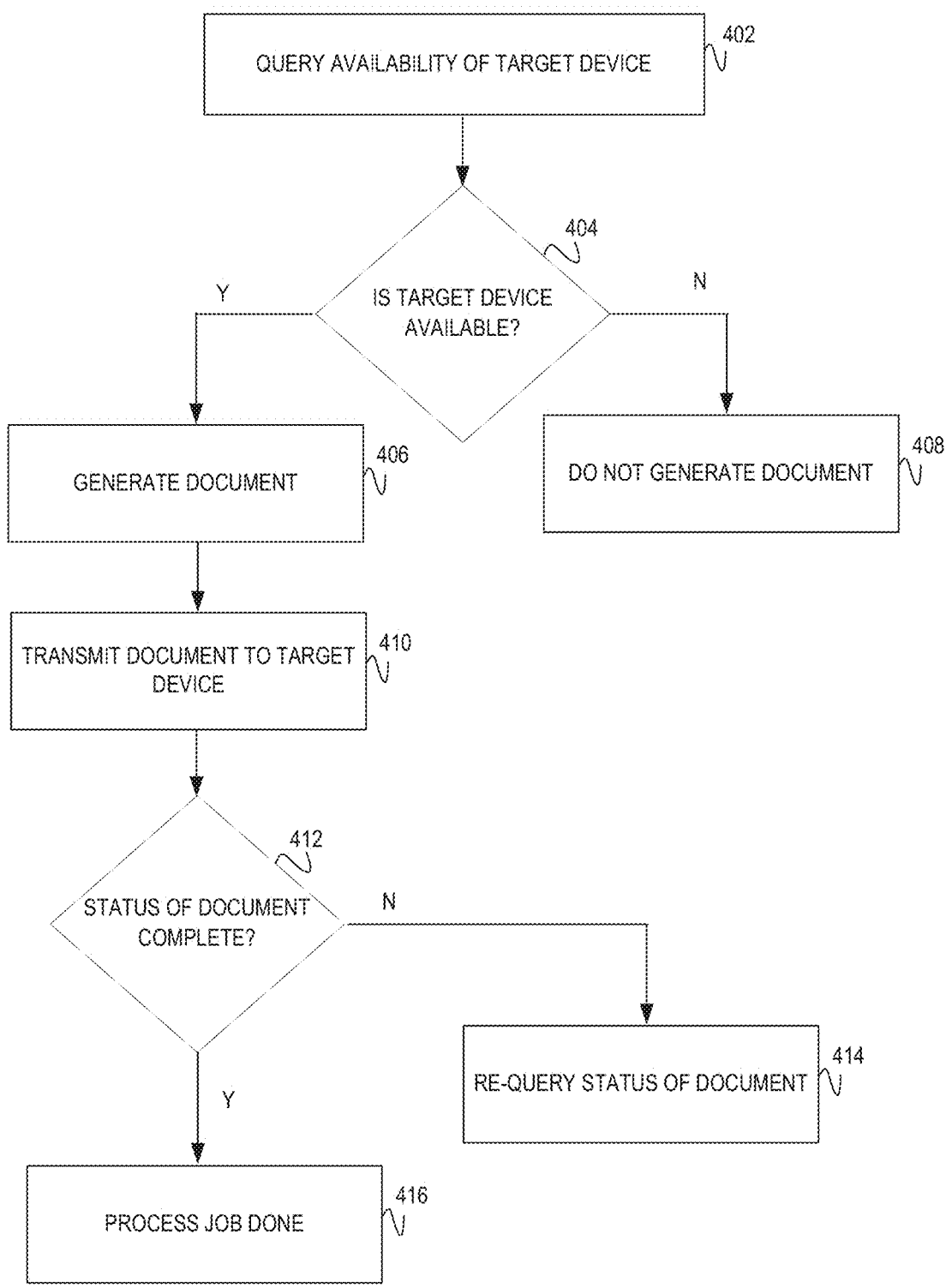
FIG. 4 is a flowchart of an example method to query an availability of a target device, generate a document, and determine whether the status of the document has been completed.

FIG. 4 is a flowchart of an example method to query an availability of a target device, generate a document, and determine a status of the generated document. The status of the generated document is a present condition of the generated document with respect to the target device. For example, the status of the generated document may indicate whether the generated document was successfully transmitted, received, and/or printed by the target device. This may include a status of completed. The status of the generated document may be used to determine a future availability of the target device. In this example, FIG. 4 builds an aggregate status of the generated document. For example, the aggregate status of printer may build up over time to determine whether the generated document is likely to be printed at the printer. The aggregate status of the target device reduces the load on system resources as fewer failed jobs (i.e., generated documents) are delivered to the target device. In discussing FIG. 4, references may be made to the components in FIG. 1 to provide contextual examples. Further, although FIG. 4 is described as implemented by a computing device 102 as in FIG. 1, it may be implemented in the form of executable instructions on a machine-readable storage medium, such as machine-readable storage medium 604 as in FIG. 6

At operations 402-408, the computing device queries the availability of the target device and depending on whether the target device is available, the computing device either generates or does not generate a document. At operation 404, the availability of the target device may be dependent on a status of a previously generated document. For example, if a previous generated document was incomplete in printing from the target device, the target device may be unavailable. At operation 406, the document may be generated with an identifier to a particular target device. Generating the document with the identifier establishes a type of security feature as the target device may have been authorized for a particular generated document. Operations 402-408 may be similar in functionality to the operations 202-208 as in FIG. 2.

At operation 410, the computing device transmits the generated document to the target device. The document is generated at operation 406 upon the determination the target device is available to receive the generated document. In another example, the target device may include a printer and the document transmitted to the target device includes a printing job.

At operation 412, the computing device queries the status of the document with regards to the target device. Operation 412 may obtain an identifier corresponding to the generated document at the target device. Obtaining the identifier, the computing device determines whether the generated document was successful (i.e., complete). If the status of the document is complete, the computing device terminates the queries of availability as at operation 416. If the status of the document is incomplete, the computing device re-queries the status of the document as at operation 414 until the generated document has reached a terminal state. The terminal state is a current condition of the generated document with respect to the target device. Querying for the current condition of the generated document on the target device enables the computing device to build up an aggregate status of the target device. Building the aggregate status enables the computing device to determine whether the target device is reliable to complete a task with the generated document, such as printing the document. The reliability of the target device may be utilized for future determinations of whether the target device is available. For example, a printing job that may be incomplete signals to the computing device, the target device may be unreliable or suffering a failure.

At operation 414, the computing device re-queries the status of the document. Re-querying for the status of the generated document on the target device enables the computing device to follow the generated document through to completion or the terminal state. For example, if the generated document has not been completed, the computing device can track the completion, such as the length of time it may take for the target device, etc.

At operation 416, the computing device terminates operations 402-414, since the status of the document is complete. The status indicates the generated document as complete represents the target device successfully received the generated document and/or successfully printed the generated document.

Figure 5:
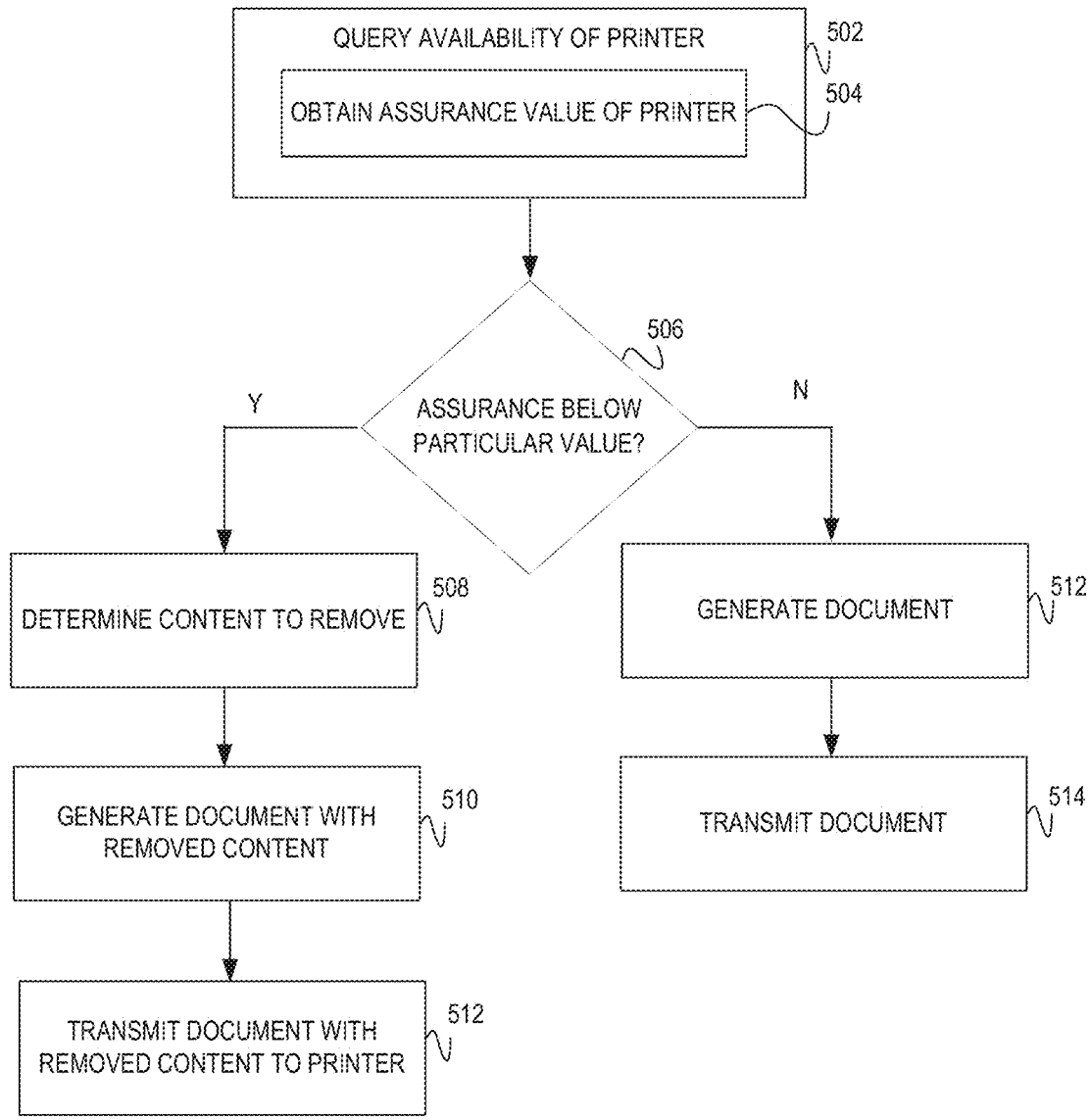
FIG. 5 is a flowchart of an example method to query an availability of a printer and obtain an assurance value of the printer, the assurance value indicates a likelihood of success of printing the document on the printer.

FIG. 5 is a flowchart of an example method to query an availability of a printer and obtain an assurance value of the printer. The assurance value indicates a likelihood of success of printing the generated document on the printer. The assurance value may be utilized to discriminate as to the type of content in the generated document that is delivered to the printer. For example, the content may include limited publication data with non-limited publication data, thus the computing device removes the limited publication data to ensure it is not wasted by an unreliable printer. In discussing FIG. 5, references may be made to the components in FIG. 1 to provide contextual examples. Further, although FIG. 5 is described as implemented by a computing device 102 as in FIG. 1, it may be implemented in the form of executable instructions on a machine-readable storage medium, such as machine-readable storage medium 604 as in FIG. 6.

At operations 502-504, the computing device queries for the availability of the printer, querying for the availability includes obtaining the assurance value for the printer. The assurance value is a value assigned to the printer which indicates the reliability of the printer and/or the likelihood of success of printing the generated document. The assurance value may be obtained with status codes tracked over a period of time, the status codes indicating the printer may be unreliable diminish the assurance value, while the status codes indicating a high reliability of the printer increases the assurance value. The status codes are weighted accordingly to determine whether the printer is available. For example, the status codes indicating the printer may be unreliable may include a previous failed print job, lower ink levels, missing ink cartridge, mechanical issues, and/or low levels of printing paper. In another example, the status codes indicating the reliability of the printer may include a previous successful print job, adequate levels of ink, or other type of codes indicating the reliability of the printer. The status codes are communicated from the printer to the computing device for tracking the reliability or unreliability of the printer.

At operation 506, the computing device determines whether the assurance value obtained at operation 504 is below a particular threshold value. The threshold value is a pre-defined value that represents the likelihood of success or failure of the generated document at the printer. If the assurance value is below the threshold, the computing device executes operations 508-512. If the assurance value is at or above the threshold value, the computing device executes operations 512-514.

At operations 508-510, if the assurance value is below the particular threshold, the computing device may determine what type of content to remove. The content to be removed from the generated document may include content that includes limited publication. For example, this may include a bank statement which may include a single generation for allocation or a particular limited number of coupons.

At operations 512-514, the computing device generates the document and transmits the document to the printer. Operations 512-514 may be similar in functionality to operations 406 and 410 as in FIG. 4.

Figure 6:
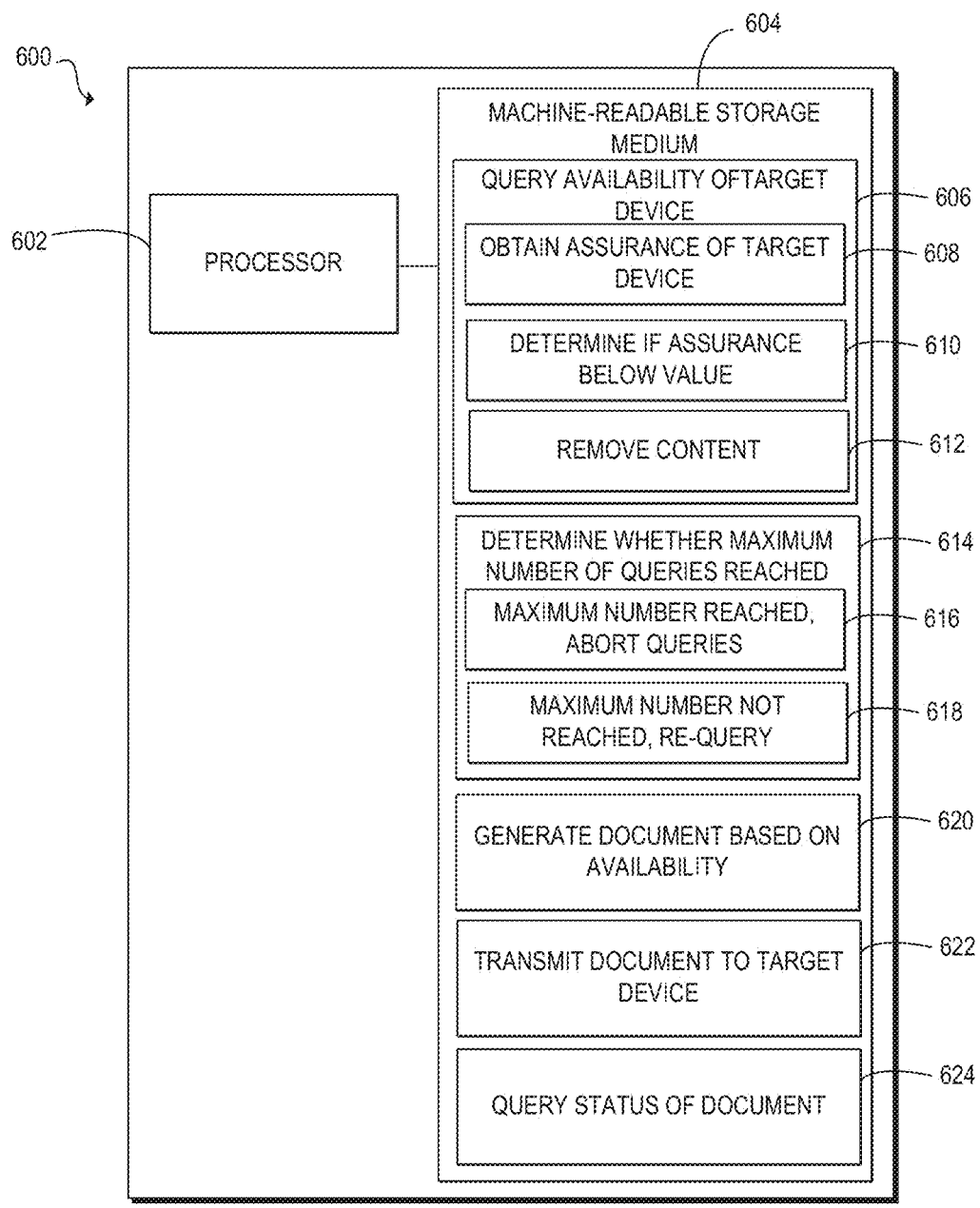
FIG. 6 is a block diagram of an example computing device with a processor to execute instructions in a machine-readable storage medium for querying an availability of a target device and determining whether a maximum number of queries have been reached.

FIG. 6 is a block diagram of computing device 600 with a processor 602 to execute instructions 606-624 within a machine-readable storage medium 604. Specifically, the computing device 600 with the processor 602 is to query an availability of a target device to determine whether to generate a document based on the availability. Although the computing device 600 includes processor 602 and machine-readable storage medium 604, it may also include other components that would be suitable to one skilled in the art. For example, the computing device 600 may include interface 106 as in FIG. 1. The computing device 600 is an electronic device with the processor 602 capable of executing instructions 606-624, and as such embodiments of the computing device 600 include a computing device, mobile device, client device, personal computer, desktop computer, laptop, tablet, video game console, or other type of electronic device capable of executing instructions 606-624. The instructions 606-624 may be implemented as methods, functions, operations, and other processes implemented as machine-readable instructions stored on the storage medium 604, which may be non-transitory, such as hardware storage devices including random access memory (RAM), read only memory (ROM), erasable programmable ROM, electrically erasable ROM, hard drives, and flash memory.

The processor 602 may fetch, decode, and execute instructions 606-624 to query the availability of the target device to generate a document for transmission to the target device. Specifically, the processor 602 executes: instructions 606 to query the availability of the target device; instructions 608 to obtain an assurance value of the target device (e.g., printer), the assurance value indicates a likelihood of printing a document on the target device; instructions 610 to determine if the assurance value is below a particular value, and if the assurance value is below the particular value, the processor 602 executes instructions 612 to remove content that may have limited distribution; instructions 614 determines whether a maximum number of queries for the availability has been reached and if so, the processor 602 executes instructions 616 to abort the queries, otherwise instructions 618 continues querying for the availability of the target device if the maximum number of queries has not been reached; instructions 620 generates the document based on the availability of the target device; instructions 622 transmits the generated document to the target device; and instructions 624 queries a status of the generated document as at the target device, such as whether the generated document has been printed. In one implementation, once executing instructions 606-612, the processor may execute instructions 620-624. In another implementation, once executing instruction 606, the processor may then execute instructions 614-618.

The machine-readable storage medium 604 includes instructions 606-624 for the processor to fetch, decode, and execute. In another embodiment, the machine-readable storage medium 604 may be an electronic, magnetic, optical, memory, storage, flash-drive, or other physical device that contains or stores executable instructions. Thus, the machine-readable storage medium 604 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 604 may include an application and/or firmware which can be utilized independently and/or in conjunction with the processor 602 to fetch, decode, and/or execute instructions of the machine-readable storage medium 604. The application and/or firmware may be stored on the machine-readable storage medium 604 and/or stored on another location of the computing device 600.

In summary, examples disclosed herein provide an effective utilization of system resources by querying an availability of a target device prior to document generation. Additionally, the examples as disclosed herein reduce the system load as fewer failed documents are processed.

We claim:

1. A non-transitory machine-readable storage medium encoded with instructions executable by a processor of a computing device, to cause the computing device to perform operations that include:
   managing distribution of a limited distribution document, the limited distribution document including a distribution limit that is based on a number of instances in which the limited distribution document can be generated for transmission to one or multiple target devices;
   wherein managing distribution of the limited distribution includes responding to a request for the limited distribution document by A) determining a likelihood that the target device is able to successfully complete a task or job for the limited distribution document before the limited distribution document is generated; and B)
   if the determined likelihood is that the target device is able to successfully complete the task or job, transmitting the limited distribution document to the target device;
   else precluding generation of at least a portion of the limited distribution document, so that the number of instances in which the limited distribution document is generated is unchanged.

2. The non-transitory machine-readable storage medium including the instructions of claim 1, wherein the target device is a printer, and wherein the instructions that are executable by the computing device cause the computing device to:
   in response to transmitting the limited distribution document to the printer,
   querying a status of whether the limited distribution document has printed, wherein if the status is incomplete, re-query the status of whether the limited distribution document has printed.

3. The non-transitory machine-readable storage medium of claim 1,
   wherein determining the likelihood includes obtaining an assurance value of the target device, the assurance value indicating a likelihood of success of printing the document;
   wherein managing distribution of the limited distribution document includes:
   upon obtaining the assurance value, determining that the assurance value is below a particular value, and
   precluding generation of at least a portion of the limited distribution document when the assurance value is below the particular value.

4. The non-transitory machine-readable storage medium of claim 2, further comprising instructions to cause the computing device to perform operations that include:
  determining whether a maximum number of queries of the availability of the target device has been reached;
  re-querying the availability of the target device if the maximum number of queries has not been reached; and
  if the maximum number of queries has been reached, aborting the queries of the availability of the target device.

5. A method executable by a computing device, the method comprising:
  managing distribution of a limited distribution document, the limited distribution document including a distribution limit that is based on a number of instances in which the limited distribution document can be generated for transmission to one or multiple target devices;
  wherein managing distribution of the limited distribution document includes responding to a request for the limited distribution document by:
  A) determining a likelihood that the target device is able to successfully complete a task or job for the limited distribution document before the limited distribution document is generated;
  B) precluding generation of at least a portion of the limited distribution document when the determined likelihood is that the target device is not able to successfully complete the task or job, so that the number of instances in which the limited distribution document is generated is unchanged.

6. The method of claim 5, further comprising:
  when the target device is unavailable, determining whether a maximum number of queries of the availability of the target device has been reached;
  when the maximum number of queries has not been reached, determining the likelihood that the target device is able to successfully complete a task or job by querying the availability of the target device.

7. The method of claim 6, further comprising:
  when the maximum number of queries of the availability has been reached, aborting the queries of the availability of the target device and determining that the target device is not able to successfully complete the task or job.

8. The method of claim 5, wherein the target device is a printer, and wherein querying the target device further comprises:
  obtaining an assurance value of the printer that is indicative of the likelihood.

9. The method of claim 8,
  wherein precluding generation of at least a portion of the limited distribution document includes determining content to remove from the limited distribution document.

10. The method of claim 5, further comprising:
  upon transmitting the limited distribution document to the target device, querying a status of the limited distribution document with regards to the target device; and
  re-querying the status of the limited distribution document when the status is incomplete.

11. The method of claim 5,
  wherein the likelihood that the target device is able to successfully complete the task or job availability of the target device is based on a status of a previous job.

12. The method of claim 5, wherein the limited distribution document includes an identifier corresponding to a particular target device.

13. A system comprising:
  an interface to query an availability of a target device; and
  a content generator to:
    manage distribution of a limited distribution document, the limited distribution document including a distribution limit that is based on a number of instances in which the limited distribution document can be generated for transmission to one or multiple target devices;
    wherein managing distribution of the limited distribution document includes responding to a request for the limited distribution document by A) determining a likelihood that the target device is able to successfully complete a task or job for the limited distribution document before the limited distribution document is generated; and B) if the determined likelihood is that the target device is able to successfully complete the task or job, transmit the limited distribution document to the target device so that the number of instances in which the limited distribution document is generated is increased to be at or closer to the limit;
    else preclude generation of at least a portion of the limited distribution document, so that the number of instances in which the limited distribution document is generated is not changed.

14. The system of claim 13, wherein the interface is an application programming interface (API) and the target device is a printer.

15. The system of claim 13, wherein determining the likelihood that the target device is able to successfully complete the task or iob for the limited distribution document includes determining a status of a previously generated document with respect to the target device.

16. The method of claim 5, wherein the distribution limit is based on a limit to a number of times the document is generated and a limit to a number of target devices that can print the limited distribution document.

17. The system of claim 13, wherein the content generator is to:
  manage distribution of the limited distribution document based on an identifier that identifies the distribution limit.

* * * * *